March 6, 1962     F. K. H. NALLINGER     3,023,986
RUNWAY CONSTRUCTION
Filed June 11, 1957
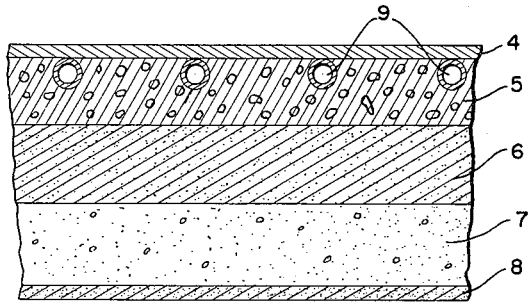
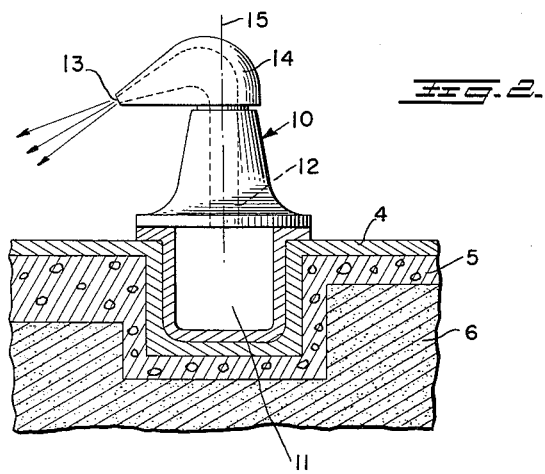
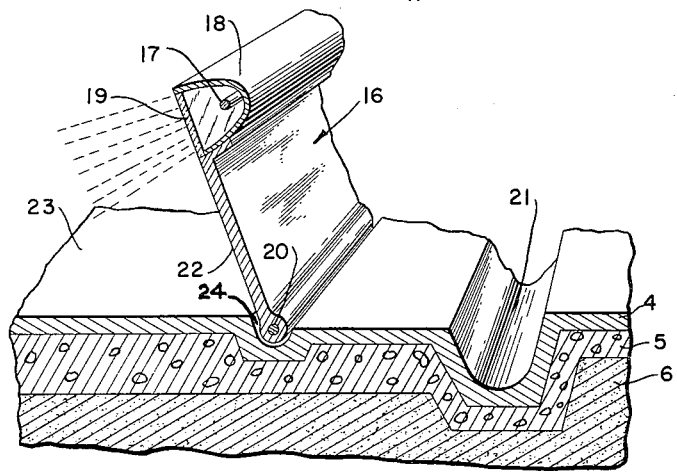
INVENTOR
FRIEDRICH K. H. NALLINGER
BY Dicke and Gray.
ATTORNEYS

United States Patent Office 3,023,986
Patented Mar. 6, 1962

3,023,986
RUNWAY CONSTRUCTION
Friedrich K. H. Nallinger, Relenbergstrasse 22,
Stuttgart, Germany
Filed June 11, 1957, Ser. No. 664,995
Claims priority, application Germany June 12, 1956
3 Claims. (Cl. 244—114)

The present invention relates to a runway construction for airplanes, and more particularly to a runway construction provided with a heating installation to maintain maximum traction for airplanes using the same especially during landing.

By reason of the smaller traction of the wheels of airplanes on wet runways, especially on runways covered with snow or ice, such runways ordinarily must be constructed of greater length than would ordinarily be required to achieve sufficient braking path when the runway is in dry condition. In other words, in calculating the required length of a runway to provide a sufficient distance for a landing plane to decelerate by applying its brake, a certain safety factor must be added to take into consideration inclement weather when the runway is wet or covered with ice and/or snow whereby the resulting friction coefficient is reduced.

The present invention aims at a sufficient gripping or tractive capacity of the runway in any weather or climatic condition so that it may be constructed of correspondingly shorter length or with the same given length used for faster airplanes, especially for jet airplanes.

Accordingly, it is an object of the present invention to provide a construction for a runway which assures sufficient gripping with the landing wheels of the airplane under all weather conditions.

It is another object of the present invention to provide a heating installation for runways which assures adequate traction for the landing airplane notwithstanding the fact that the runway may be wet and/or covered with snow or ice.

Another object of the present invention is the provision of a heating installation for runways which makes it possible to construct the runways of shorter length because of the assurance of sufficient gripping or traction with the wheels of the planes.

Still another object of the present invention is to provide a construction for a runway which enables use thereof with a given length for faster planes.

A still further object of the present invention resides in the provision of an installation which may be readily installed in existing runways so as to adapt the same for accommodating faster planes.

These and other objects, features and advantages of the present invention will become more obvious from the following description when taken in connection with the accompanying drawing which shows, for purposes of illustration only, several embodiments in accordance with the present invention, and wherein:

FIGURE 1 is a partial longitudinal cross-sectional view through a first embodiment of a runway provided with a heating installation in accordance with the present invention;

FIGURE 2 is a partial transverse cross-sectional view through a second embodiment of a runway provided with a heating installation in accordance with the present invention; and FIGURE 3 is a partial transverse cross-sectional perspective view of a third embodiment of a runway provided with a heating construction in accordance with the present invention.

The present invention consists in that the runway is provided with an installation for heating the same which is stationary, or which might possibly be lowered into the plane of the runway. The heating installation may consist of a pipe system arranged within the cover of the runway through which a heating medium, such as steam or hot air is conducted. For the same purpose, however, hot-air blowers or heat radiators may also be placed at the edge of the runway.

Referring now to the drawing, wherein like reference numerals are used throughout the various views to designate like parts, the runway which may be of conventional construction consists, for example, of an asphalt concrete layer 4, of a base 5 made of gravel or crushed stones with a macadam cover, a sand bed 6, a cement layer 7, and of a sand cushion 8. It is understood, of course, that the runway may also be constructed in any other suitable manner.

FIGURE 1, which illustrates a partial cross-sectional view in the longitudinal direction of the runway, shows a plurality of transversely extending heating pipes 9 embedded directly below the asphalt layer 4. A suitable heating medium, for instance, steam or hot air, is supplied to the transversely extending pipes 9 from a common supply pipe or line (not shown) which extends in the longitudinal direction along one side of the runway and with which the transversely extending pipes 9 are connected at predetermined intervals over the entire length of the runway. The heating medium is returned through a common discharge pipe or line (not shown) arranged along the opposite side of the runway back to the heating source.

FIGURE 2 shows a part of the cover for the runway in transverse cross section and one of the hot air blowers generally designated by reference numeral 10 which are disposed along both edges of the runway. The heating medium, such as hot air or combustion gas which flows through common supply channel or duct 11 of which one is disposed on each side of the runway for the air blowers disposed on the respective side reaches the blower 10 through the branch lines 12 and is blown onto the surface 4 of the runway by means of a wide-angle nozzle 13 which directs the stream of heating medium against the surface of the runway. The head 14 of the blower is thereby oscillated to and fro about a vertical axis 15 in any suitable conventional manner, for example, by means of an electric motor and a crank mechanism (not shown) so that each blower 10 and therewith the heating medium discharged from a respective wide-angle nozzle 13 evenly covers a predetermined triangularly shaped surface, the depth and width of which corresponds to the runway. By appropriately staggering the blowers 10 arranged on both sides of the runway with respect to each other, it is possible to obtain a heating of the entire runway surface without any spots not covered by the heating arrangement.

FIGURE 3 is a perspective view of a terminal portion of the edge of the runway partially in cross section. Heat radiators generally designated by reference numeral 16 of suitable construction are arranged one directly followed by another on both sides of the runway in the longitudinal direction thereof so as to provide an essentially continuous arrangement of heat radiators along both longitudinal sides of the runway. Each heat radiator 16 is electrically heated by means of a resistance heat element 17 and is provided with a tubularly shaped reflector 18, of any suitable shape and construction, which directs the heat rays appropriately focused or arranged in beams through a protective glass 19 toward the surface of the runway. Each heat radiator 16 which may be of suitable length is pivotal about the axis 20 and may be lowered into the recess or groove 21 provided in the asphalt layer 4 so that during non-use thereof the outer surface 22 is flush with the outer surface 23 of the runway. When in use, it is only necessary to raise heat radiator assembly 16 by rotating the same until the surface 22 comes into abutment with the shoulder 24 formed by the off-set in the asphalt layer 4.

The present invention is of particular significance with the advent of jet airplanes having a much higher landing speed than the propeller-driven commercial planes used heretofore. Ordinarily, the higher landing speeds would require increases in the length of existing runways to safely accommodate the faster jet planes. However, the length of existing runways is oftentimes limited by lack of adequate space to enlarge the same. By the use of the present invention and installation of a heating system in accordance therewith, the existing extra-length heretofore necessitated by the aforementioned safety factor during use of the runway for landing the slower propeller-driven planes in wet or snowy and icy weather may be put to use for safely landing the faster jet planes.

While I have shown and described several preferred embodiments in accordance with the present invention, it is understood that the same is not limited thereto but is susceptible of many changes and modifications within the spirit of the present invention, and I intend to cover all such changes and modifications as encompassed by the appended claims.

I claim:

1. A runway for airplanes adapted to safely accommodate relatively fast planes within a given length thereof comprising an outer runway layer, and movable local heating means including electrically-heated heat radiators arranged along at least one edge of said runway, said heat radiators being lowerable into a recess provided in the outer surface of said runway so as to form an essentially flush surface therewith when lowered and being adapted to be raised from said recess so as to heat said runway from above to prevent the formation of ice and snow thereon and thereby maintain an essentially constant coefficient of friction for the wheels of the plane with the runway.

2. A runway for airplanes according to claim 1, wherein said heat radiators are pivotally arranged to be lowerable into a recess provided in the outer surface of said runway so as to form an essentially flush surface therewith.

3. A runway for airplanes according to claim 2, wherein each of said heat radiators includes an electric resistance heating element, a reflector having an open end for directing the heat rays toward the surface of said runway, and a protective means covering said open end of said reflector, said last-mentioned means allowing the passage of said heat rays.

References Cited in the file of this patent

UNITED STATES PATENTS

| | | |
|---|---|---|
| 1,793,719 | Reader | Feb. 24, 1931 |
| 1,917,141 | Middleton | July 4, 1933 |
| 1,949,295 | Dean | Feb. 27, 1934 |
| 2,497,998 | Lee | Feb. 21, 1950 |
| 2,505,622 | McKee | Apr. 25, 1950 |
| 2,634,659 | Jordanoff | Apr. 14, 1953 |
| 2,876,326 | Akmentin | Mar. 3, 1959 |

FOREIGN PATENTS

| | | |
|---|---|---|
| 818,983 | France | June 28, 1937 |